(12) United States Patent
Shah

(10) Patent No.: US 12,462,849 B1
(45) Date of Patent: Nov. 4, 2025

(54) SYSTEMS AND METHODS FOR EDITING A VIDEO RECORDING IN PROGRESS

(71) Applicant: Nishant Shah, Aurora, IL (US)

(72) Inventor: Nishant Shah, Aurora, IL (US)

( * ) Notice: Subject to any disclaimer, the term of this patent is extended or adjusted under 35 U.S.C. 154(b) by 0 days.

(21) Appl. No.: 19/221,815

(22) Filed: May 29, 2025

(51) Int. Cl.
*G11B 27/036* (2006.01)

(52) U.S. Cl.
CPC .................... *G11B 27/036* (2013.01)

(58) Field of Classification Search
CPC ..................................... G11B 27/036
See application file for complete search history.

(56) References Cited

U.S. PATENT DOCUMENTS

| | | | |
|---|---|---|---|
| 2007/0025693 A1* | 2/2007 | Shibata | G11B 27/034 386/327 |
| 2021/0312948 A1* | 10/2021 | Haley | H04N 21/2743 |

* cited by examiner

*Primary Examiner* — Girumsew Wendmagegn
(74) *Attorney, Agent, or Firm* — The Law Offices of Konrad Sherinian, LLC; Jeffrey S. Dixon

(57) ABSTRACT

A mobile app based digital media recording system with a back-clip feature for creating and manipulating back-clip segments from already recorded portions of a digital audio and/or video recording in progress. The feature allows a user to remove the back-clip segments on the fly and/or to create a reel, which may be a blooper or highlight reel, of the segments created during the main recording.

10 Claims, 10 Drawing Sheets

SYSTEMS AND METHODS FOR EDITING A VIDEO RECORDING IN PROGRESS

CROSS REFERENCE

FIELD OF THE DISCLOSURE

The present disclosure relates to electronic media file creation and management systems and methods, and more particularly, to systems and methods for recording, organizing, customizing, and editing visual and audiovisual media.

SUMMARY

According to an aspect of the disclosure, a video recording system comprises a camera, a storage, a display, a processor, a user input interface and a software application. The camera is operative to produce a physical main stream of digital video data comprising sequentially ordered frames of digital video data, each digital video data frame representing a digital frame image. The storage comprises a non-volatile computer-readable medium comprising a plurality of physical memory locations. The processor is operatively connected to the camera to read the digital video data frames from the physical main stream of digital video data, operatively connected to the storage to write the digital video data frames to the physical memory locations and to read the digital video data frames from the physical memory locations, and operatively connected to the display to display the corresponding digital frame images on the display. The user input interface is operative to receive physical user input and to generate user input data from the physical user input, the user input data representing the processor being operative to read the user input data from the user input interface. The software application comprises computer readable instructions stored in the storage, the processor being operative to read and execute the instructions from the storage. More particularly, the software application includes instructions for the processor to display controls on the display, the controls being adapted and configured to be activated by physical user input to the user input interface. The controls include a record control.

The software application further includes instructions for the processor, when the record control is activated, to: begin to record main video footage comprising a consecutive sequence of digital video data frames produced by the camera after the record control is activated, by so reading from the camera and writing to the storage the consecutive sequence of digital video data frames; generate and begin to maintain a logical main stream of video, the logical main stream of video comprising a video timeline defined by a main start pointer and a main end pointer, the main start pointer being a logical entity referencing a physical memory location of a first digital video data frame of the main video footage, and the main end pointer being a logical entity that references a physical memory location of a last digital video data frame of the main video footage, the logical main stream of video being maintained by the processor continuously updating the main end pointer to reference the physical memory location of a digital video data frame most recently written to the storage, and display a stop control and a pause control.

The software further includes instructions for the processor, when the pause control is activated, to: pause said recording of the main video footage and said updating the main end pointer; display a back-clip control; display a resume control, when the back-clip control is activated, to: display a back-clip pointer selection control; when the back-clip pointer selection control is activated, to receive from the user input interface user input data to determine a contiguous back-clip video segment that was written to storage before the activation of the back-clip control, the back-clip video segment being defined by a static logical back-clip of digital video data, the logical back-clip comprising a back-clip start pointer and a back-clip end pointer, the logical back-clip comprising a video timeline defined by the back-clip start pointer and the back-clip end pointer, the back-clip start pointer being a logical entity referencing a physical memory location to which a first digital video data frame of the back-clip video segment was written, the back-clip end pointer being a logical entity referencing a physical memory location to which a last digital video data frame of the back-clip video segment was written.

The software application further includes instructions for the processor, when the resume control is activated, to: resume said recording of main video footage and said updating the main end pointer.

The software application further includes instructions for the processor, when the stop control is activated, to: stop said recording of main video footage; write to the storage a digital main video file comprising main video file footage from the main video footage, the main video file footage comprising a pre-back-clip video segment and a resumption video segment of the main video footage, the pre-back clip video segment being a contiguous segment of the main video footage that was written to storage before the back-clip video segment, the resumption video segment being a contiguous segment of the main video footage that was written to storage after the resume control was activated.

BRIEF DESCRIPTION OF THE DRAWINGS

Although the characteristic features of this disclosure will be particularly pointed out in the claims, the disclosed method and system, and how it may be made and used, may be better understood by referring to the following description taken in connection with the accompanying drawings forming a part hereof, wherein like reference numerals refer to like parts throughout the several views and in which:

A person of ordinary skill in the art will appreciate that elements of the figures above are illustrated for simplicity and clarity and are not necessarily drawn to scale. The dimensions of some elements in the figures may have been exaggerated relative to other elements to help to understand the present teachings. Furthermore, a particular order in which certain elements, parts, components, modules, steps, actions, events and/or processes are described or illustrated may not be required. A person of ordinary skill in the art will appreciate that, for simplicity and clarity of illustration, some commonly known and well-understood elements that are useful and/or necessary in a commercially feasible embodiment may not be depicted to provide a clear view of various embodiments per the present teachings.

DETAILED DESCRIPTION

In the following description of exemplary systems and methods embodying aspects of the disclosure, reference is made to the accompanying drawings, which form a part hereof, and in which are shown by way of illustration various example devices, systems, and environments in which aspects of the disclosed system and method can be practiced. Other specific arrangements of parts, example devices, systems, and environments, can be used, and structural modifications and functional modifications can be made without departing from the scope of the disclosed system and method.

Disclosed herein are systems and methods for integrated electronic file creation and organization. More particularly, in the embodiments described and illustrated herein, the electronic files are digital media files (photos and videos, with or without sound). The systems and methods are typically implemented by a software application, "app," or where applicable "mobile app," executed on an electronic computing system (typically that of a smartphone), which is operatively connected to a video camera (or "camera"). The computing system includes a processor, a memory, a user output device (which is shown as a display in the illustrated embodiments but may be or also include a speaker) and a user input device (which is shown as comprising a touchscreen, and which may alternatively or additionally include a microphone and/or hard buttons). The camera includes a lens, an image sensor, and a video processor. The computing system and the camera can be integrated into a single housing or enclosure, such as that of a smartphone or other small, handheld electronic device. However, it should be understood that the principles of the interface can easily be used on other types of devices as well, such as digital camcorders, digital cameras, or remote-control software operating on a computer or other device to control a remotely located camera, which comprises at least lens and a sensor located in a separate enclosure from the computer.

System Components

Figure 1:
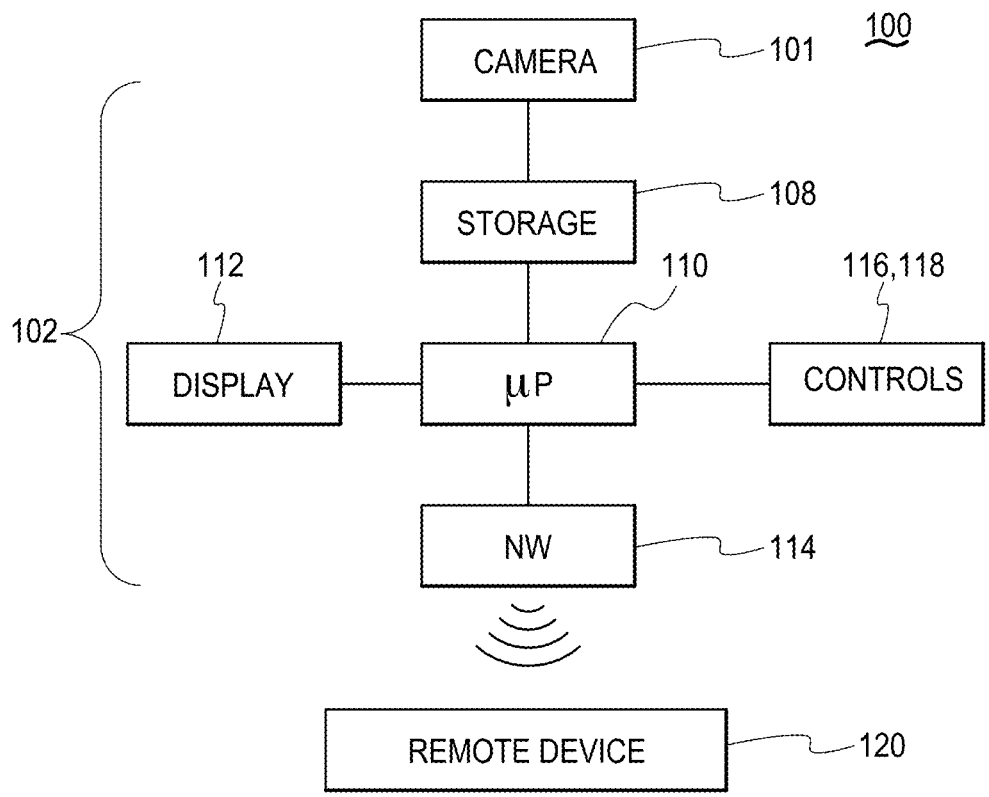
FIG. 1 is a simplified block diagram of a system for digital media creation and file management according to an embodiment.

Shown in FIG. 1 is a simplified block diagram illustrating the general construction of a recording and file management system 100 according to embodiments of the disclosure. The recording system 100 includes a recording component 101 (which is depicted as a "CAMERA" block and is alternately referred to herein as a camera 101, but which more broadly can comprise a camera and/or a microphone), which typically comprises a camera including at least an image sensor and a lens that focuses light on the image sensor; a storage 108, a processor 110, an output device 112 (which is depicted as a "DISPLAY" block and is alternately referred to herein as a display 112, but which more broadly can comprise a display and/or a sound-emitting device such as a speaker), controls including manual controls 116 and automatic controls 118, a network interface 114, and optionally a remote device 120. In embodiments, the camera 101, storage 108, processor 110, display 112, controls 116 and 118, and network interface 114 are comprised in a recording device 102 (alternately referred to as a camera device 102, and more particularly a mobile device 102 depicted in FIGS. 2-11 as a smartphone running a system mobile app). In embodiments, the remote device 120 can be another recording device/camera device 102 including the same components as illustrated in FIG. 1.

In other embodiments, the components of the recording device 102, that is, the camera 101, storage 108, processor 110, display 112, controls 116, 118, and/or network interface 114 can be distributed among multiple physically separate devices that are operatively connected, via wired or wireless connections, so as to enable such components interact with one another in the same ways as described herein for corresponding components of a single device. For example, a first device such as smartphone, tablet, or laptop computer may comprise the display 112, controls 116, 118, and network interface 114 of the system 100, while the camera 101, storage 108 or some portion thereof, and/or the processor 110, may reside in one or more remote devices 120, which may for example include a cloud server connected to the first device, another device of the same type connected to the first device via a local area network or peer-to-peer connection, or a standalone storage device connected in any such manner to the first device. In other examples, the camera or recording component 101 may reside in a wearable device such as glasses or a watch, in a mechanical device with self-propelled movement, such as a drone or other air, land, or water vehicle, a robot (for example, an assembly line robot, a surgical robot, or a personal-assistant robot), a gantry, or an elevator or lift system. In embodiments, the system has a remote interface application that allows users to control and manage their recording device from another device at another location, offering the convenience and flexibility of a remote desktop-like experience. The remote interface application can be a module of the system mobile app or a separate standalone application, which can be used on the other device to "drive" an instance of the mobile app running on the recording device, for example as described in detail in U.S. patent application Ser.

No. 18/903,435, hereby incorporated by reference. In other embodiments, system software that implements aspects and functionality of the system mobile app described herein can integrate into or interact with other software programs. For example, the system software can be stored in a cloud server as an application programming interface ("API"), which can be exposed as a web browser plugin, as a plugin to a desktop or mobile conferencing application such as Zoom®, Microsoft Teams®, or Google Meet®, as a mobile device object, as a computer interface, or by other suitable means.

It will further be noted that certain embodiments may not include all of the components illustrated in FIG. 1 and described herein. For example, in lieu of a camera, the recording component 101 may consist of a "screen recorder" software utility, which would not require a lens, an image sensor, or a video processor. A screen recorder may be used, for example, for recording display views that include user-interface images referred to in software tutorials or training videos, where the views displayed and recorded may consist entirely of graphics that are generated by program instructions rather than images captured by a camera. In some cases, the views displayed on a screen may include camera images, may even be live-streamed from a camera, such as that of a video conference participant. However, such a camera could be entirely independent of a recording component 101 embodied as a screen recorder that simply records the images shown on a display, whatever their origin.

In embodiments employing a screen recorder as the recording component 101, the processor 110 or other suitable processor can be instructed to read each of a series of digital image data frames from a digital video data stream as the corresponding digital image frame is displayed on, or just before it is sent to, a system display (such as a computer monitor or the integrated display screen of a laptop, smartphone, or other electronic device), write the series of digital image data frames to storage as a digital video data stream, and use the digital video data stream in the same ways as described for any embodiment of the disclosure. For example, instead of reading digital image data frames from the image sensor or video processor of a camera, or from locations in the storage 108 where the video processor has written them, the processor 110 can read each digital image data frame from a graphics card (not shown) just before the frame is sent to a display. More particularly, the software of the system 100 may request the digital image data frames from a device operating system (OS), which can grant the request by allowing the processor 110 to read each digital image data frame and pass it to the system software, just before it is sent to the display. This can allow the OS to refuse to permit an app to record a screen where content with digital rights management (DRM) protections is playing. In addition, some embodiments may not require a network interface 114. Other embodiments may similarly not require other components. For example, the network interface 114 can interface directly with the video processor and even the image sensor, so that video can be directly streamed to a remote device 120 via the network interface 114. In addition, certain other components, such as a microphone for recording audio either concurrently/synchronized with or independently of video, may be present in the recording system 100 but have been omitted for brevity and clarity.

Typically, the output of an image sensor will be processed by a video processor (which may be the central processor of an electronic device that includes the camera, or it may be a separate video processor, such as the processor 110), which will process the video from the image sensor and write or commit full frames of video to storage 108. The video processor may process data from the image sensor at a frame rate. In embodiments, a video processor that is separate from the processor 110 writes frame data directly to storage 108 via a DMA channel. In other embodiments, the processor 110 reads data from the video processor (or directly from the image sensor, in which case a video processor can be omitted) and writes the frame data to storage 108.

The storage 108 used by the recording system 100 can be any suitable type of non-volatile memory device, having a write speed that is sufficient for the frame rate at which the recording system 100 is operated.

During recording of video, the processor 110 reads frame data from storage 108 or directly from an image sensor or video processor of the camera 101 and displays it in real time on the display 112. The processor 110 also performs housekeeping activities, such as configuring the video processor if any, accepting manual controls 116 and automatic controls 118, and interfacing with one or more remote devices 120 via the network interface 114.

The display 112 can be, for example, a Liquid Crystal Display (LCD), an LED or an OLED display, or another type of display, and is of sufficient resolution and refresh rate for the video camera operator to view and monitor the scene that is being recorded. In certain implementations, the display 112 can be a touchscreen.

As mentioned above, controls of the recording system 100 can include both manual controls 116 and automatic controls 118. Manual controls 116 are components that receive and transmit manual user inputs to the processor 110, while automatic controls 118 are components that automatically generate and transmit inputs to the processor 110.

Manual user inputs to the processor 110 allow the camera operator to control the operation of the recording system 100. The manual controls 116 can include, for example, a touch screen system, or a collection of buttons, sliders, joysticks, gesture controls, voice controls, and other input control components, as are typical in video camera systems.

The automatic controls 118 transmit inputs automatically to the processor 110, such as geolocation and user activity, as described below. The automatic controls 118 can include, for example, a geolocation component operative to determine the geolocation of a camera device 102, such as a GPS component retained by the camera device 102, a clock, and/or one or more sensors such as a light sensor and/or a motion sensor retained by the camera device 102. For purposes of this disclosure, where not stated otherwise, a "camera device" includes at least a camera, comprising such components as are commonly understood to be required to be present at or near the location of the subject(s) of the image frames captured in a photograph or video recording. More particularly, a camera includes at least a lens and a sensor. The lens and sensor are understood to be coupled to a processor, be it a video processor or a more general-purpose central processor of a multi-purpose electronic device that includes a camera and other components. In the illustrated embodiment depicted schematically in FIG. 1, in addition to the camera 101, the camera device 102 further includes the storage device 108, the processor 110, the display 112, the manual controls 116, the automatic controls 118, and the network interface 114. In other embodiments, any of the latter group of components can be remotely coupled to a camera device.

Exemplary Interface

Figure 1A:
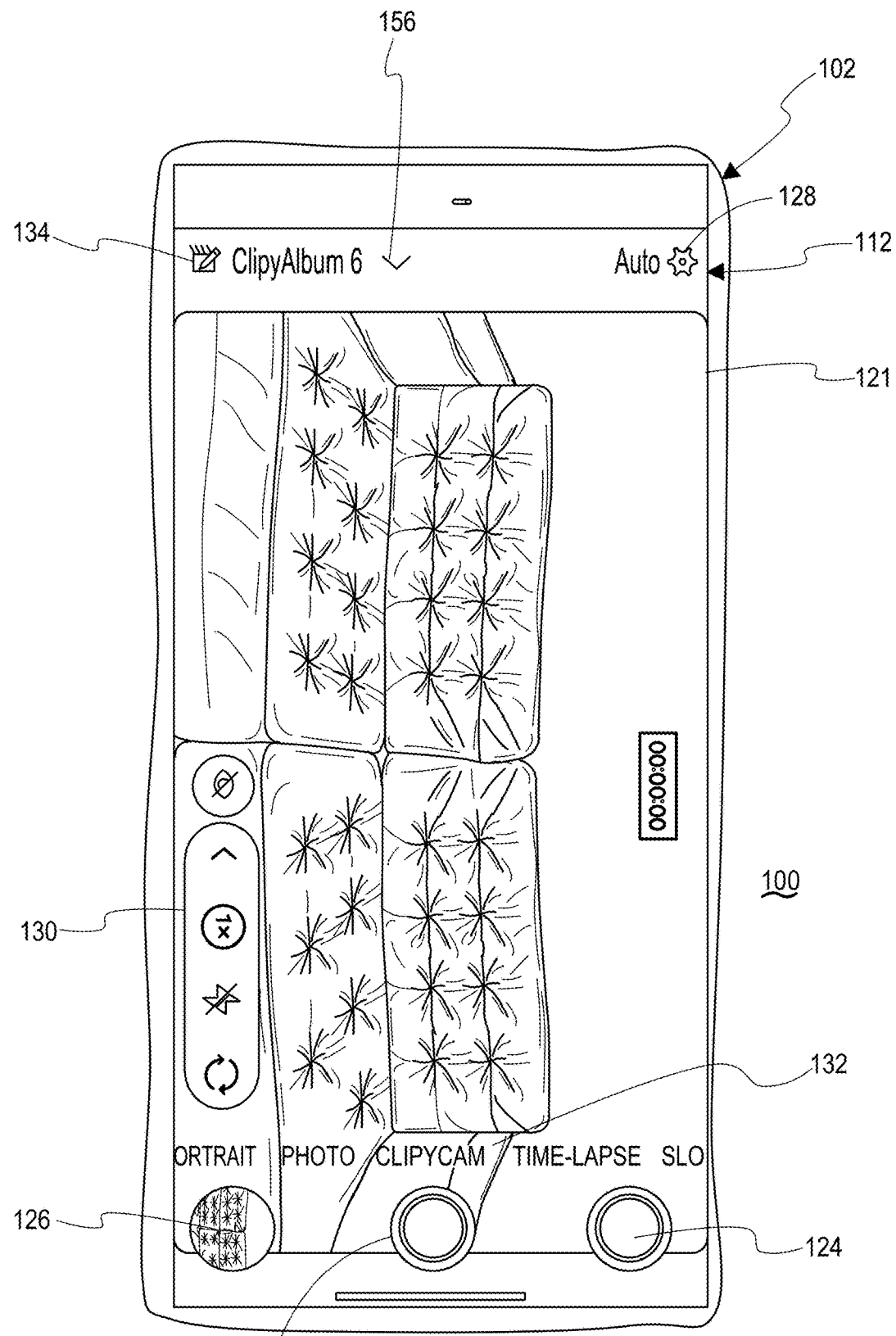
FIG. 1A is a view of a camera operator interface displayed on a mobile device according to an embodiment of the system of FIG. 1.
Figure 1B:
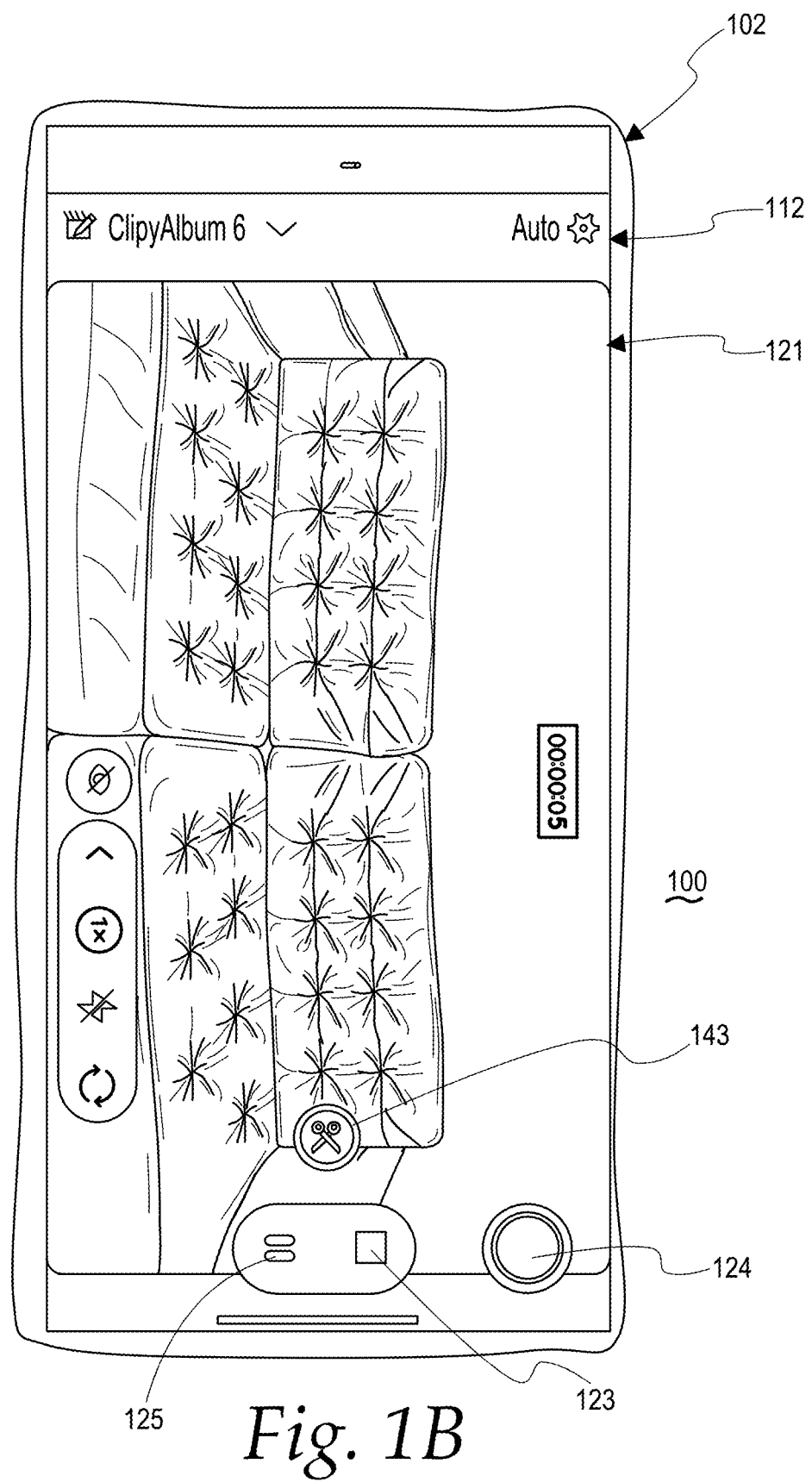
FIG. 1B is another view of a camera operator interface displayed on a mobile device according to an embodiment of the system of FIG. 1.
Figure 1C:
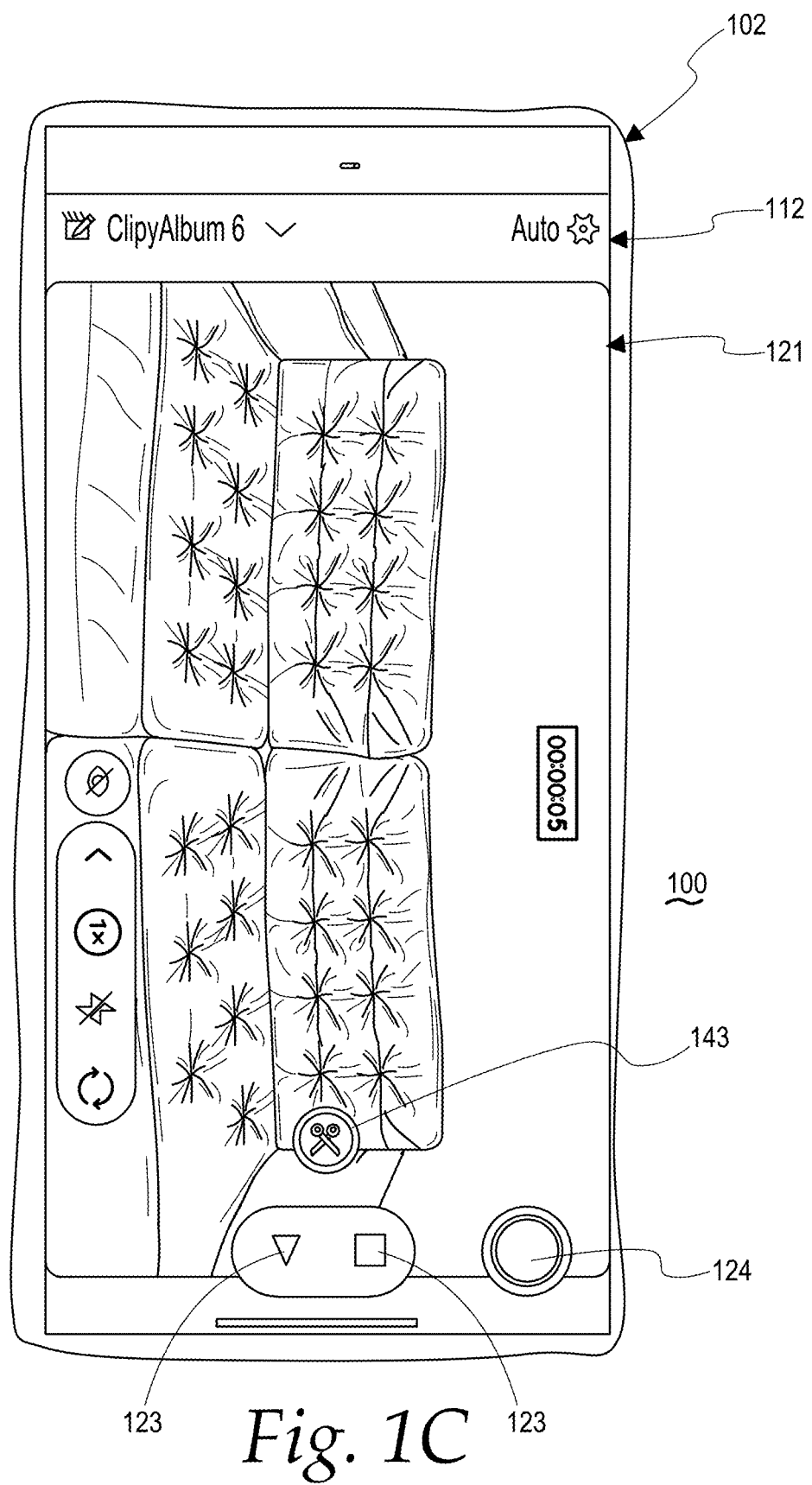
FIG. 1C is another view of a camera operator interface displayed on a mobile device according to an embodiment of the system of FIG. 1.

Turning to FIGS. 1A-1C, views or screens of an exemplary interface for the camera operator are disclosed, as displayed on the display 112 of the camera device 102, which in the illustrated embodiment is a touchscreen display. When a camera mode is activated, the interface displays in a digital viewfinder 121 a live scene captured by the camera 101. The exemplary interface also includes a number of touch controls. When no recording is in progress, a record control 122 is shown as a "button" image comprising a "record" symbol (standard circle symbol commonly associated with recording) displayed in an actuatable area of the touchscreen display 112. When the record control 122 has been activated and a recording is in progress, in place of the record control 122 are displayed a stop control 123 as a standard "stop" (square) symbol and a pause control 125 as a standard "pause" (vertical pair of parallel lines) symbol. A user activating the record control 122 as shown in FIG. 1A initiates a recording, and a user activating the stop control 123 or pause control 125 as shown in FIG. 1B, the recording is stopped or paused. Stopping the recording commits to storage a physical main stream of video data that was captured since the last activation of the record control 122 and causes the record control 122 to be displayed again. It should be understood that other embodiments within the scope of the disclosed system and method can represent record/stop controls and/or their states in many different ways, including always-displayed record, stop, pause, and resume controls in separate areas of a displayed user interface.

Additional controls displayed in the exemplary interface as shown in FIG. 1A include a snap control 124, displayed as a button icon, which creates a digital still image (photo) file of the live scene when activated by a user; a file navigation link 126, displayed as a thumbnail of the most recently captured video frame or still image, which can cause a file navigation or gallery interface (not shown) to be displayed when activated; a settings control 128, displayed as a familiar gear icon, which opens a settings menu when activated; an expandable and collapsible toolbar 130 including a number of tool selection controls represented by individual icons, as described in detail in U.S. patent application Ser. No. 18/903,435, the entire disclosure of which is hereby incorporated by reference herein; a mode-selection ribbon 132, displayed as scrollable ribbon of text, which allows a user to toggle between various camera modes, by either swiping the ribbon to the left or right until the name of the desired mode is centered in the viewfinder 121 or by tapping the name of any desired mode that appears in the window; an edit event info control 133; and a pinned album indicator 134, the latter two controls relating to an album-management aspect of the system 100 described in detail in U.S. patent application Ser. No. 18/903,435. An additional control that is displayed in the exemplary interface as shown in FIG. 1B is a clip control 143, which is described in detail, for example, in U.S. Pat. Nos. 11,380,359, 11,677,905, 12,075,192, the entire disclosures of which are hereby incorporated by reference herein.

It should be noted that systems illustrated herein can be utilized with camera systems (or smartphone, tablet, and other systems) that utilize multiple cameras or multiple lenses. For example, it is known in the art to record from multiple cameras or lenses simultaneously; for example, a wide-angle camera or lens can be used to record an entire scene (such as an entire stage), while a zoom camera or lens can be used to record the center of a scene (such as a part of the stage where the action is).

"Back-Clips" of Previous Segments of Paused Recording in Progress

When recording digital media, users often become aware that a segment calling for later attention or editing has been recorded as part of the main recording. For example, an incident such as a recorded subject mispronouncing a name or word, other mistakes (e.g., jostling or fumbling a camera or microphone, a subject fumbling over scripted or improvised words), external interference such as background noise (e.g., dogs barking) or an unintended subject wandering into a video recording frame, can result in the recording in progress having an undesired segment coinciding with the incident. In other cases, an unexpected "highlight" event may be captured as part of a recording in progress. After having recorded the beginning if not the entirety of the highlight event, the user may wish to highlight the segment of recording that was captured during the entire timespan of the highlight event and only during that timespan.

In existing systems and methods, when something goes wrong during recording, users choose whether to restart the entire recording or to resume recording, starting with a retake (or do-over) presentation of the intended content of the do-over segment. If they choose to resume recording with a retake, they will still have to locate, parse, and delete the corresponding undesired segment from the main recording after the recording is complete. Likewise, once the beginning of the highlight event has already been recorded as part of a main recording still in progress, in existing systems and methods, it is too late for the user to set the start of a clip at a precise moment in which the highlight event started, so users of existing systems will typically have to wait for post-editing to create a clip from the main recording that pinpoints the beginning of the highlight event. Such post-editing requires time, editing skills, and sometimes professional help. This process can be frustrating and time-consuming. There is a need for a more efficient way to address unexpected incidents and highlights that occur while recording digital media, without complex editing workflows.

According to an aspect of the disclosure, a video recording system includes a feature that addresses the foregoing need by allowing a user to immediately remove, or to parse out and flag for subsequent removal (where both removing immediately and flagging for later removal may be referred to as "discarding" in the context of this disclosure), a previously recorded segment of a video recording in progress containing an error, interruption, or other incident, without the need to locate the segment later during post-editing, and then to continue recording seamlessly. It is to be understood that a difference between flagging a discarded segment for later removal and immediately removing the discarded segment from the main video recording is that, in the case of immediate removal, the discarded segment will be omitted from any replay of the main video while recording is in progress.

This saves time and reduces the pressure on the camera user and/or captured subjects to get everything right on a first take. In particular, a user is enabled to pause the recording in progress after an incident occurs, "clip" a preceding video segment (referred to hereinafter as a "back-clip," which can be a "reject clip" or "blooper clip" in the present context, or even a "highlight clip" for purposes of features described further below) that comprises a sequence of video frames captured before the pause, and then resume recording by unpausing. Recording then resumes from the last frame of the back-clip, or in the case of the back-clip being immediately removed from the main video recording stream, recording resumes from the last frame that preceded the first frame of the back-clip prior to its removal. The back-clip frame sequence can be defined by a back-clip start pointer and a back-clip end pointer, which are logical entities respectively referencing a first back-clip frame ("back-clip start frame") and last back-clip frame ("back-clip end frame") of the back-clip frame sequence, respectively.

In embodiments, the back-clip end pointer is set at the current pause point by default, but the user can be prompted to choose whether to accept the default end pointer position or instead to continue playback until the user identifies and selects a desired last back-clip frame, such as a frame that is played back after the conclusion of the incident and before the beginning of a portion of content that was fully captured after the incident and before the pause. For example, the user may realize during recording that a speaker made an error at an earlier point, followed by presenting a significant amount of content without error or incident. The user may prefer to locate and discard a segment containing the error at that time, while it is fresher in the user's mind, than at a later time after the entire recording is concluded, but also to do so without deleting subsequent content that was unaffected by the error. In that case, when the user next "unpauses" the recording, the user can be prompted to choose whether to resume recording from the current pause point (after the subsequent unaffected content), or to "re-record" the back-clip content by inserting newly recorded video before the first frame of the subsequent unaffected content (the frame that immediately followed the back-clip end pointer). If the video is then paused and unpaused again, the user can again be prompted to choose whether to resume re-recording of the back-clip content, the newly recorded video to be inserted after the last re-recorded video and before the back-clip end pointer, or if the back-clip content re-recording is completed, to resume recording from the last frame of the main recording, following the subsequent content that was unaffected by the error.

Pause-to-Pause and Start-to-Pause Discard Back-Clips (Simple Embodiment or Default Mode)

Figure 3:
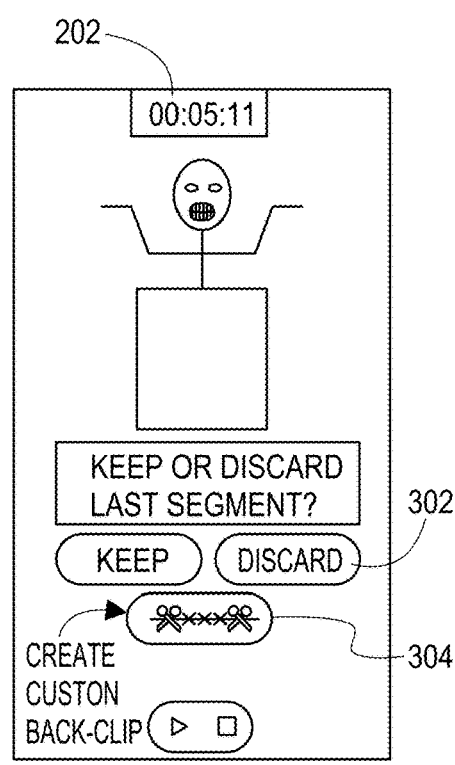
FIG. 3 is a next view of the sequence of camera operator interface views beginning with FIG. 2.

According to a simple embodiment or default mode of generating back-clips in the system 10, each time a user pauses a main video recording, the application can display a prompt 302, as shown in FIG. 3, for the user to choose whether to "Keep" or "Discard" the last segment of video, that is, the segment of a main video stream that was recorded between the last two pauses, or the segment of video recorded before a first pause. In another embodiment, a prompt similar to the prompt 302 may be presented to the user only after the user activates a pause control and then a back-clip control corresponding to the pause-to-pause or start-to-pause functionality described here.

When the user selects "Keep," the last segment is kept as part of the main video stream of the recording in progress. In embodiments, a back-clip corresponding to the last segment is generated and stored as a separate back-clip file. (It will be understood that the data representing the visual contents of each frame can be stored in just one physical location, and rather than duplicate the frame content data of the "back-clipped" video segment corresponding to the back-clip, the back-clip file may simply comprise the back-clip start and end pointers, which include references to the physical memory addresses of the respective first and last frames of the back-clipped video segment, while each frame of the back-clipped video segment in turn contains data referencing the physical memory address of the next frame, up to the last frame, so that storing the back-clip start and end pointers in the back-clip file provides enough information for a processor to locate and read the frames of the back-clipped video segment in sequential order, as explained in detail, for example, in the above-referenced patents describing the clip control 143.)

When the user selects "Discard," a back-clip is at once defined and discarded, the newly defined back-clip having a back-clip start pointer that is automatically set to the last preceding pause point, if any, or if none, then to the start point of the main video recording in progress, and a back-clip end pointer that is automatically set to the current pause point. The discarded back-clip is either automatically removed from a main recording stream of the video recording in progress or flagged for later removal, such as by automatic or user-prompted removal when a user stops the recording. In the case of user-prompted removal, if more than one back-clip was defined during recording, the user can be prompted to confirm the removal from the main video fall of all back-clips at once or of each back-clip one at a time, for example by displaying the corresponding back-clip start frame and enabling the user to play back the back-clip, if desired, before confirming its removal.

Such back-clips can be referred to as a "pause-to-pause" or "start-to-pause" back-clips for ease of reference. In embodiments not shown, the prompt 302 can provide a third "Keep and Highlight" option, which is operative when selected by the user to generate a pause-to-pause or start-to-pause back-clip that is not to be discarded but rather to be designated as a highlight clip corresponding to a highlight segment of the main video stream. For example, the back-clip can be highlighted by creating a corresponding highlight clip file, by appending the back-clip to a highlight reel file (as described further below), and/or by visually highlighting a segment of a displayed main video stream timeline corresponding to the highlighted back-clip (not shown).

Custom Back Clips with Manually Set Start and End Pointers

Figure 2:
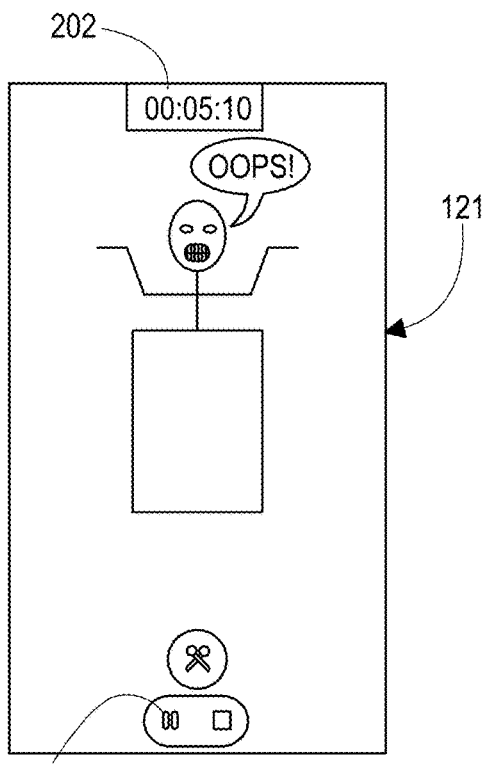
FIG. 2 is a first of a sequence of views of a camera operator interface, illustrating a back-clip creation feature of the system of FIG. 1 and a method of using the same, according to embodiments.
Figure 4:
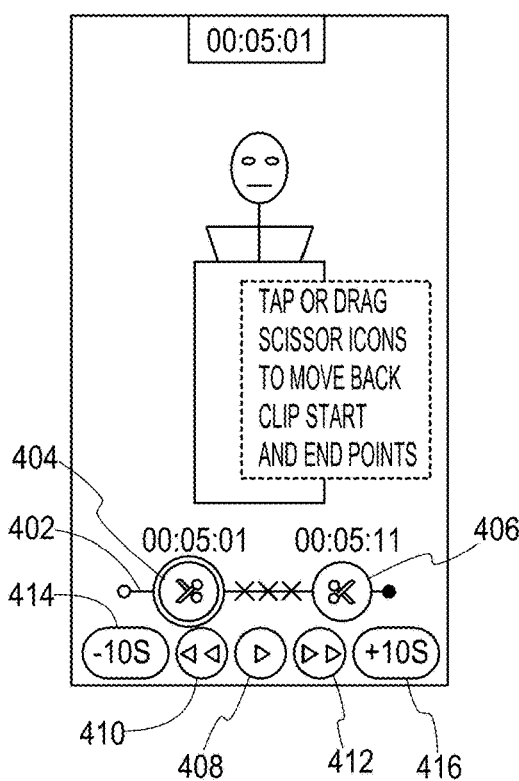
FIG. 4 is a next view of the sequence of camera operator interface views beginning with FIG. 2.

As an alternative to the above-described simple embodiment, or as an additional mode, the application can allow the user to define custom back-clips (as either highlight or discard back-clips) by manually setting back-clip start and/or end pointer(s), as in the following description. Exemplary mobile interface screenshots depicting a sequence from a pause activation through the initiation of a back-clip function and the manual setting of a back-clip start pointer are shown in FIGS. 2-8. With reference to FIG. 2, a user interface for a video recording in progress is displayed, including a viewfinder area 121, a video timer 202, a pause control 125, and a stop control 123. When a user observes that a presenting speaker has made a mistake, the user activates the pause control 125, and a main set of paused video controls is displayed as shown in FIG. 3, which include a resume control 127 (displayed as a triangle that will be recognized as a standard "play" symbol) that is operative to "unpause" and resume recording video to be appended to the recording in progress after the current pause point), a stop control 123 that is operative to end the recording in progress and generate a main video file therefrom, and a main back-clip control 304 that is operative to initiate a back-clip function described as follows. As shown in FIG. 4, when the main back-clip control 304 has been activated, the recording system mobile app displays a back-clip interface that includes a visual timeline 402 of the recording in progress, where back-clip start and end pointers 404, 406 are represented as visual icons on the timeline 402. In an embodiment, when the user touches one of the pointers 404, 406, a row of video controls is displayed that includes a playback/set pointer control 408 (which initially appears as a standard "play" symbol), rewind and fast-forward controls 410, 412, and incremental back-up and advance controls 414, 416 (which are operative to back up or advance playback of the recorded video by a number of seconds, such as ten seconds as displayed, or in other embodiments, five, twenty, or thirty seconds, for example) to enable a user to locate and select the start and end frames of a segment of the main video that the user wants to set as a back-clip.

Figure 5:
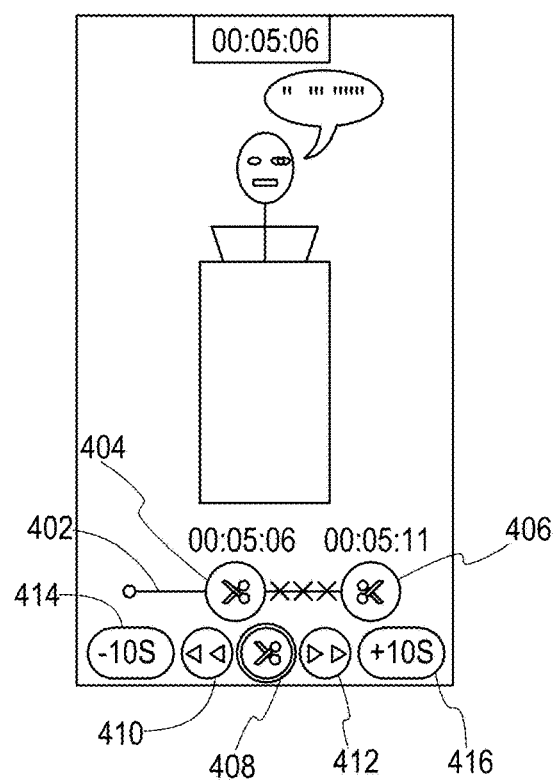
FIG. 5 is a next view of the sequence of camera operator interface views beginning with FIG. 2.
Figure 6:
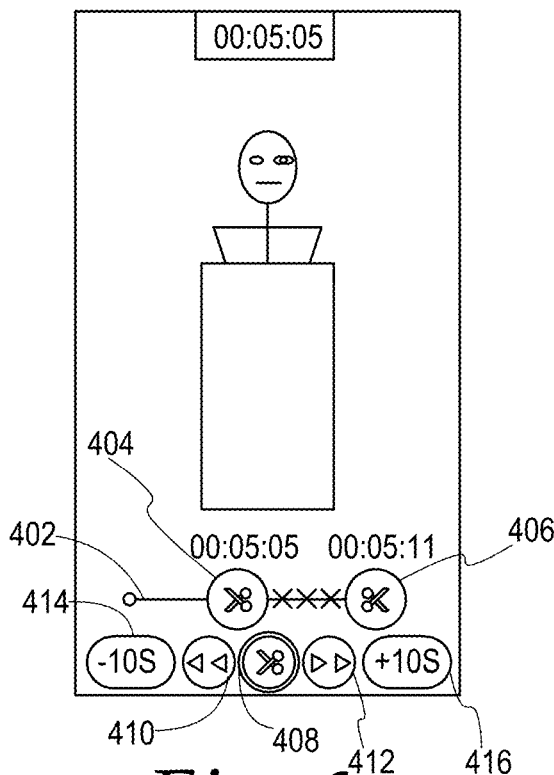
FIG. 6 is a next view of the sequence of camera operator interface views beginning with FIG. 2.

For example, the back-clip start pointer 404 may initially be set at ten seconds before (shown as time 00:05:01, indicating zero hours, five minutes and one second of elapsed recording time from the start of a main video recording in progress) the current pause point (shown as time 00:05:11) of the main video recording, and the back-clip end pointer 406 may initially be set at the pause point. With reference to FIG. 4, the user has touched the back-clip start pointer 404, and when the user then activates the playback/set pointer control 408, the app will play back recorded video from a frame corresponding to the initial position of the back-clip start pointer 404. As shown in FIG. 5, the user has then activated the playback/set pointer control 408 and played back five seconds of the video recording in progress, up to time 00:05:06. At that time, the user recognizes that the presenter has started a segment of speech where the error occurred (such as a sentence or sentences without a significant pause). The user then activates the rewind control 410 to rewind the playback to a frame at time 00:05:05, just before the do-over segment begins, as shown in FIG. 6. The user then activates the playback/set pointer control 408 (now appearing as an icon resembling the back-clip start pointer 404) again, which pauses the playback and sets the back-clip start pointer 404 to the frame then displayed.

If, on the other hand, the user had determined on initially playing back the video that the first back-clip frame should precede the initial position of the back-clip start pointer 404, for example, because the error had already occurred, or a segment of speech that contained the error had already begun, the user could back up or rewind the back-clip start pointer 404 to a previous point, by activating the backup control 414 and/or the rewind control 410. It will be noted that the rewind control 410 can toggle between various rewind speeds (such as 1×, 10×, 20×, or 30× the recording framerate, for example) on repeated touch activations. Optionally, the mobile app interface can permit the user to adjust one or both back-clip start and end pointers 404, 406 by touching and dragging the pointer 404, 406 along the timeline 402. In addition, a time stamp is displayed for each pointer 404, 406 indicating its recording time position, and the time stamp is updated whenever a pointer 404, 406 is moved, whether by touching and dragging or by activating any of the previously described controls. From the rewound location of the back-clip start pointer 404, the user can restart playback and again watch and listen again for a desired location of the beginning of the back-clip. The user can repeat the foregoing steps as many times as necessary until able to identify a desired back-clip start frame and set the back-clip start pointer 404 accordingly, followed by confirming or further editing the start and end times of the back-clip in the following description.

Figure 7:
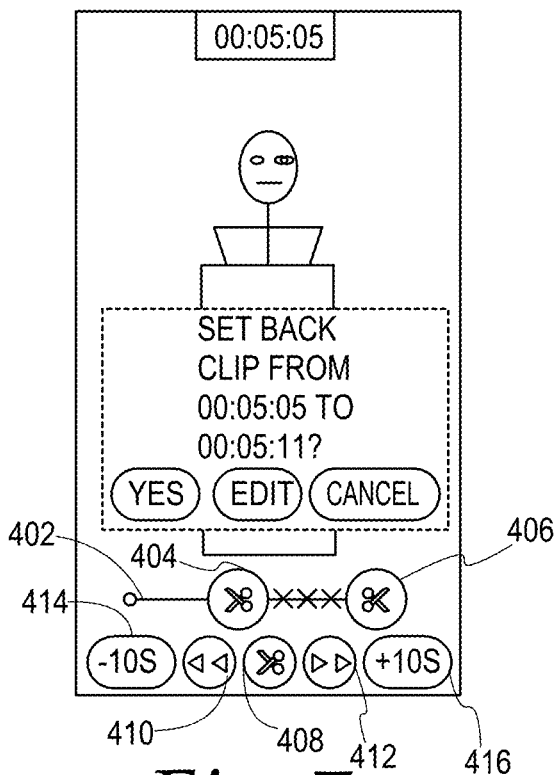
FIG. 7 is a next view of the sequence of camera operator interface views beginning with FIG. 2.

As shown in FIG. 7, after setting the position of the back-clip start pointer 404, the user is then prompted to confirm whether to set a back-clip from times 00:05:05 to 00:05:11 (in some cases and/or embodiments not shown, the prompt may show start and end times in finer increments than hours, minutes, and seconds, such as by including tenths or hundredths of a second, to more precisely reflect the time positions of the frames respectively corresponding to the start and end pointers set by the user), to which the user may either respond "Yes," "Edit" (to return to the back-clip function to move one or both back-clip start and end pointers 404, 406 in the same manner as described herein for the back-clip start pointer 404), or "Cancel" (to return to the main paused video interface shown in FIG. 3 and display the last frame recorded before the pause point, without setting a back-clip). On a "Yes" selection, a custom back-clip having the corresponding start and end pointers is defined.

Figure 8:
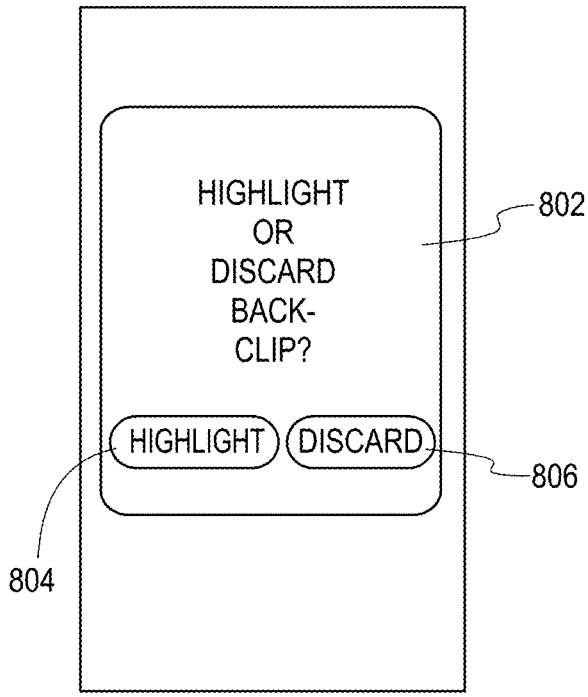
FIG. 8 is a next view of the sequence of camera operator interface views beginning with FIG. 2.

Next, a user prompt 802 is displayed as shown in FIG. 8 (similar to that of FIG. 3 displayed on pause activation) for a user to select whether to "Highlight" 804 or "Discard" 806 the newly defined custom back-clip. When a user selects "Discard," the custom back-clip can either be removed immediately or flagged for later removal, exactly as described above for a discarded start-to-pause or pause-to-pause back-clip.

When a user selects "Highlight," the custom back-clip is kept as part of the main video stream as well as being highlighted in some manner, such as one of those described above for pause-to-pause and start-to-pause back-clips. Unlike for the prompt of FIG. 3, which appears on every pause activation, a separate "Keep" option is omitted from the prompt 802 of FIG. 8, as it may be assumed that a user would not have bothered to create a custom back-clip unless the user wanted either to discard or highlight it. In other embodiments not shown, the user can be prompted with all three options to "Keep," "Keep and Highlight," or "Discard" even in the case of a custom back-clip, so that the user can differentiate back-clips that are truly highlights from back-clips that are merely created to index the content of a main video stream. In that case, the "Keep" selection may be operative to visually tag a segment of a main video stream timeline that corresponds to the back-clip (to be displayed on playback of the recording in progress and when playing the resulting video file from storage) and/or to create a separate file of the back-clip, whereas the "Keep and Highlight" selection may have the effect, in addition to designating the back-clip a "highlight" clip, which can be included in a highlight reel to be generated from the main video stream, as described further below.

Main Recording Stream Timer Adjusted During Recording to Reflect Duration of Discarded Back-Clips In addition, regardless of whether a discarded back-clip is immediately removed or flagged for later removal, the time displayed in the main video stream timer 202 can be updated to reflect the playback time of the main video stream with discarded back-clips removed. Thus, during recording of a video segment to be appended to the end of a main video stream, the time shown in the main video stream timer 202 can reflect a total recording time of the main video stream minus the cumulative duration of all discarded back-clips. During playback of non-discarded segments of the main video stream, the main video stream timer 202 can dynamically display what will be the run time to the currently displayed frame of an edited video file to be generated from the main video stream, when all discarded back-clips are removed. If discarded back-clips are retained in the main video stream for playback purposes, then, during playback of a discarded back-clip, the main video stream timer 202 will statically display the adjusted run time to the start pointer of that back-clip. That is, the total recording time up to that point, minus the cumulative total duration of all preceding discarded back-clips, if any, will remain statically displayed throughout playback of the discarded back-clip being viewed. When playback has reached the end of the discarded back-clip and begins to replay a subsequent non-discarded segment of the main video stream, the main video stream timer 202 will then resume counting up. In this manner, the main video stream timer 202 allows a user to monitor what will be the run time of the edited video file up to the frame currently being recorded or played back.

In more particular embodiments, a separate back-clip run timer (not shown) can be displayed at the same time as the main video stream timer 202 during playback of a discarded back-clip, optionally together with a progress bar or timeline representation of the current playback position relative to the start and end pointers of the back-clip being replayed, to provide the user with a visual indication of how much of the discarded back-clip has been replayed, and how much remains to be replayed, at a given time during playback.

Blooper/Highlight Reel Generated from Back-Clips

In a particular embodiment, rejected back-clips to be removed from a main recording can be designated "blooper" clips, and instead of simply deleting them, the application can automatically generate a blooper reel file comprised of the blooper clips spliced together in series, each successive blooper clip being appended to the last. This can provide a fun or motivational look at the recording process, showcasing mistakes, mispronunciations, and funny moments. The blooper clips individually and/or the blooper reel can be used as humorous or behind-the-scenes content, helping users realize that mistakes are part of the creative process and encouraging newcomers to sound recording and/or videography, as well as newcomers to the type of presentation or performance that is the subject of the main recording from which the blooper reel is generated. Similarly, back-clips selected to be kept in the main recording stream as highlight clips can be logically "copied" (again, such as by referencing the physical memory addresses of the first and last time instants of each back-clip, without physically duplicating content data) from the main file and spliced together in a highlight reel file.

Figure 9:
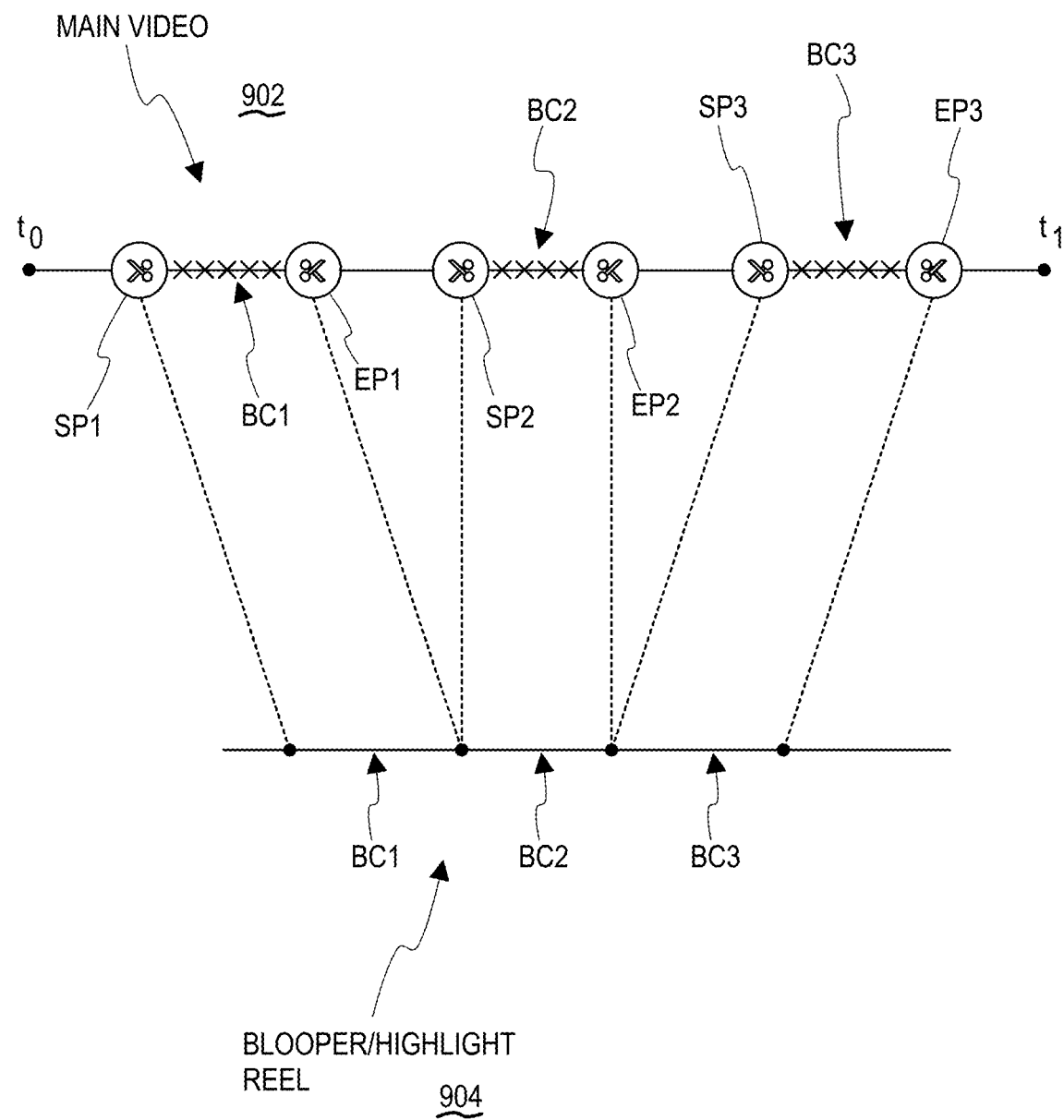
FIG. 9 is a schematic illustration of the creation of a back-clip reel of spliced together back-clips created from a main stream of a video recording in progress.

Shown in FIG. 9 is a schematic visual illustration of the generation of a blooper or highlight reel video file 904 from a main video stream 902, the latter being represented as a timeline running from a main video recording start time $t_0$ to a main video recording end time $t_1$. Thus, when back-clips BC1, BC2, and BC3, being all of one type (all bloopers or all highlights), are generated from a main video stream 902 by a user setting their respective pairs of start and end pointers SP1/EP1, SP2/EP2, and SP3/EP3 at points on the timeline of the main video stream 902, and a user then stops recording the main video stream 902, the corresponding blooper or highlight reel video file 904 is generated as a logical video stream that concatenates logical references to the back-clips BC1, BC2, and BC3, sequenced in the chronological order of their corresponding video segments on the timeline of the main video stream 902. In embodiments, a user can shuffle the order of the back-clips of the blooper or highlight reel 904, such as by tapping and dragging one back-clip at a time to a new position relative to the others, in a visual representation similar to that of FIG. 9, where each respective back-clip may be further represented by a thumbnail image taken therefrom (not shown).

Figure 10:
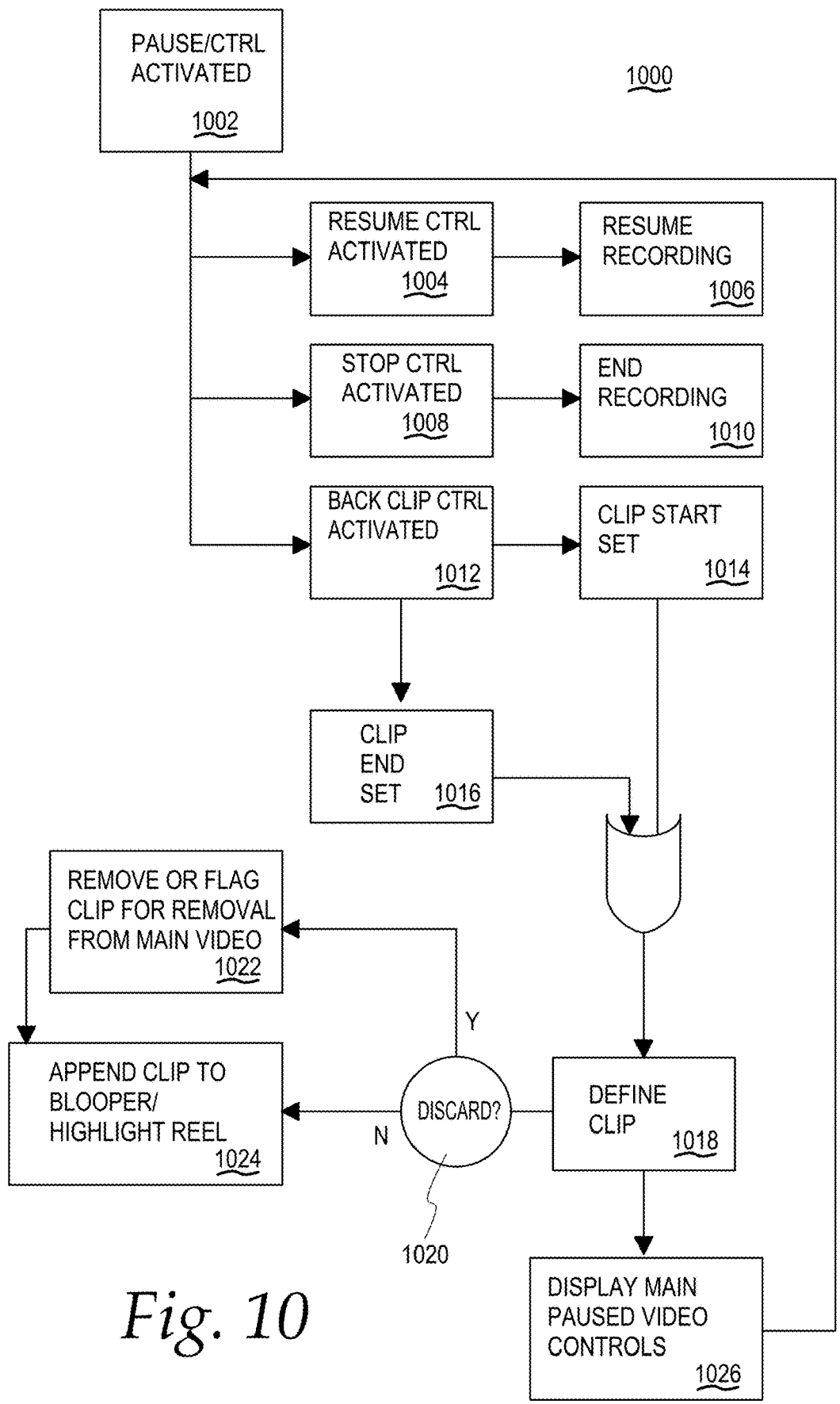
FIG. 10 is a simplified flowchart illustrating a method of using a video recording system to create back-clips and back-clip reels from a main stream of a video recording in progress according to an embodiment.

Turning to FIG. 10, a simplified flowchart is presented which illustrates a method 1000 of generating back-clips, and optionally a back-clip reel, from a main stream of a video recording in progress. First, in a step 1002, a user activates a pause control. Next, a user may either activate a resume ("play"), stop, or back-clip control. When the user activates the resume control in a step 1004, the system responds by resuming recording of the main stream of video in a step 1006 without generating a back clip. When the user activates the stop control in a step 1008, the system responds by ending the recording in progress in a step 1010, without generating a back clip. When the user activates a back clip control in a step 1012, the system responds by receiving user input selections setting a back clip start point in a step 1014 and a back clip end point in a step 1016, where the steps 1014 and 1016 may occur in any order. Upon completion of the steps 1014 and 1016, the system responds in a step 1018 by defining a back clip that begins with the start point and ends with the end point as just set by the user. The system can then prompt the user to choose whether to discard or keep the back clip just defined, in a step 1020. When the user chooses to discard, the system either removes or flags the back clip for removal in a step 1022, followed by optionally appending the back clip to a blooper or highlight reel in a step 1024. When the user chooses to keep the back clip, the system bypasses the step 1022 and continues directly to the step 1024. After the back clip is defined, the system displays the main paused video controls in a step 1026, which can be followed by the user initiating one of the steps 1004, 1006, 1008 by activating the resume or stop control, or activating the back clip control again, to generate another back clip in the same manner.

It will be further appreciated that clip reels generated in this manner from a main video recording can be comprised of clips created in various ways while the main video recording is in progress, and not necessarily entirely of back-clips created from previously recorded segments while the recording is paused, as described in the present disclosure. For example, a clip can be created by activating the clip control 143 to set clip start and end pointers while recording live, so that a main video stream and a clip video stream are recorded simultaneously, as described, for example, in the previously referenced U.S. patents that describe a clip control. Systems according to this disclosure can further incorporate a rewind clip start control that allows a user to rewind the position of the start pointer of a clip on a video timeline of a main video recording in progress, such as in set time increments, while the clip video stream and a main video stream continue to be recorded, as described, for example in U.S. Pat. No. 11,677,905 (previously mentioned and incorporated by reference). The present disclosure will be understood to encompass clip reels created from clips that are created in any of the foregoing ways. Further, it will be appreciated that a user may desire to compile into a clip reel a set of clips that are associated with one another in other ways than being a set of bloopers or highlights, for example, such as by relating to a common subject. Such clips can be designated to be compiled together into a specified reel. For example, a user can be prompted upon the creation of any back-clip, or upon setting the start pointer of any live clip, to indicate whether the clip is to be added to a particular reel, which may be existing or newly defined, and which may be assigned an arbitrary default name (such as "Reel1," "Reel2," etc.) or a user-created name, such as ("Jimmy's scenes").

Applicability to Pure Audio Recordings and Treatment of Audio Streams of Audiovisual Recordings It will additionally be appreciated that systems of creating back clips from a main "video" recording stream as described and illustrated herein can be assumed to refer to audiovisual recordings, i.e., recordings that combine a stream of video captured synchronously with a corresponding audio stream, unless stated otherwise. In addition, systems and methods of creating back clips from a purely audio main recording stream are within the scope of this disclosure and can be constituted and operate substantially as described in the foregoing video example. It will of course be noted that a purely audio data stream does not have image data frames, but rather is comprised of a time-ordered sequence of discrete audio samples. (In the general case, pure video, pure audio, and audiovisual recordings are referred to herein as types of "digital media recordings," and digital video image frames and digital audio samples are referred to herein as types of discrete time interval "digital media data units") Thus, a main audio recording stream and an audio clip stream are audio timelines defined by respective start and end pointers that reference the start and end times of the respective main audio recording segment and audio clip segment and the audio samples captured at those times on the respective timelines.

It will further be noted that, in the typical case of an audiovisual recording, which comprises an audio recording synchronized to a video recording, the sample rate of the audio recording is typically on the order of tens of kHz, such as 44.1-48 kHz, which is much faster than typical frame rates of the video recording on the order of 24-30 fps, so that the display time interval of an image frame will span over one thousand audio samples. Meanwhile, the internal clock of a typical processor of a device for use with the disclosed systems can detect time intervals on the order of nanoseconds and smaller. Thus, the time instants associated with start and end pointers set by a user will generally fall somewhere in the middle of the time span of an image frame and that of an audio sample within the image frame. The system software can apply a suitable rule for this general case, for entirely including, entirely excluding, or partially including the image frame and audio sample that span the time instant of the pointer, as well as other audio samples spanned by the time interval of the image frame. For example, the entire image frame that spans the time instant of the pointer can be included in the clip, along with all audio samples that overlap any portion of the image frame time interval, only those audio samples that lie entirely within the image frame time interval, or only the audio sample that spans the time interval and the audio samples that follow or precede that sample (according to whether the pointer is a start or end pointer). In other embodiments, a portion of the time interval of an image frame and/or of an audio sample that precedes the time instant of a start pointer or follows the time instant of an end pointer can be cut out of a clip.

Lock, Refresh, Edit GPS Location

Figure 11:
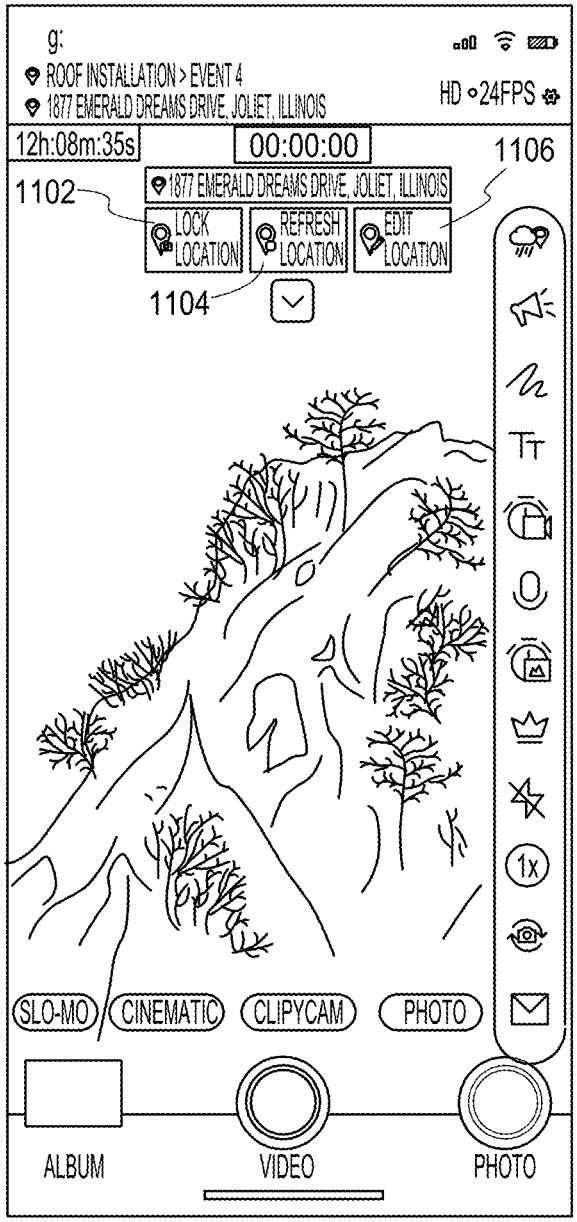
FIG. 11 is a first of a sequence of camera operator interface views illustrating a geolocation options feature of the system of FIG. 1 and a method of using the same, according to embodiments.
Figure 12:
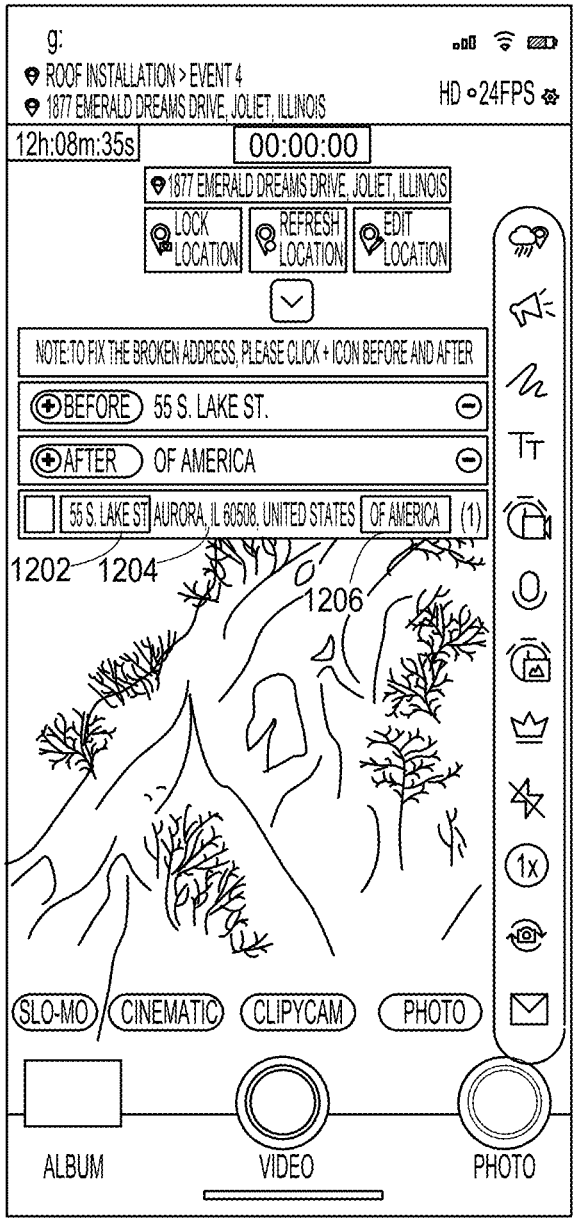
FIG. 12 is a next view of the sequence of camera operator interface views beginning with FIG. 11.

According to another aspect of the disclosure, with reference to FIGS. 11-12, the mobile app of the recording system 100 includes a suite of features to enable a user to lock, refresh, update, and/or edit information associated with a geolocation detected by a GPS component of the user's mobile device 102. Thus, the mobile app interface screenshot shown in FIG. 11 shows a trio of touch control buttons denoted a lock location control 1102, a refresh location control 1104, and an update location control 1106 within a viewfinder window 121. When activated, the lock location control 1102 is operative to pause the GPS function of the user's mobile device 102, as may be desirable to save battery life that is otherwise steadily consumed by communicating with GPS satellites (or other geolocation infrastructure), for example, when the user anticipates remaining at the same address or landmark location for an extended time. In an embodiment, when the user has activated the lock location control 1102, the text of the associated control button is changed to read "Unlock Location" (not shown), and a subsequent activation of the control 1102 by the user resumes the GPS function.

The refresh location control 1104 is operative, when activated by a user, to resume a locked GPS function until a geolocation is confirmed, and to update location information 1108 (such as an address or landmark) displayed in the mobile app interface, which will be associated as metadata with any photo (singular image frame) or video that is captured using the mobile app while that location information 1108 is displayed. In an embodiment, activating the refresh location control 1104 is also operative to display a drop-down list of nearby addresses, from which a user can select an address that the user wishes to associate with media files concurrently captured.

The update location control 1106 is operative, when activated by the user, to enable the user to edit at least a portion of the location information 1108 and/or add further contextual information. Thus, turning to FIG. 12, activating the update location control 1106 can be operative to display a location editing interface that allows the user to modify portions of the location information 1108, such as a beginning portion 1202 and an end portion 1204 of an address, for which a middle portion 1206 (displayed as including a U.S. city, state and zip code, followed by the words "United States") can be locked or also editable.

Muted Video Recording During a Call

Figure 13:
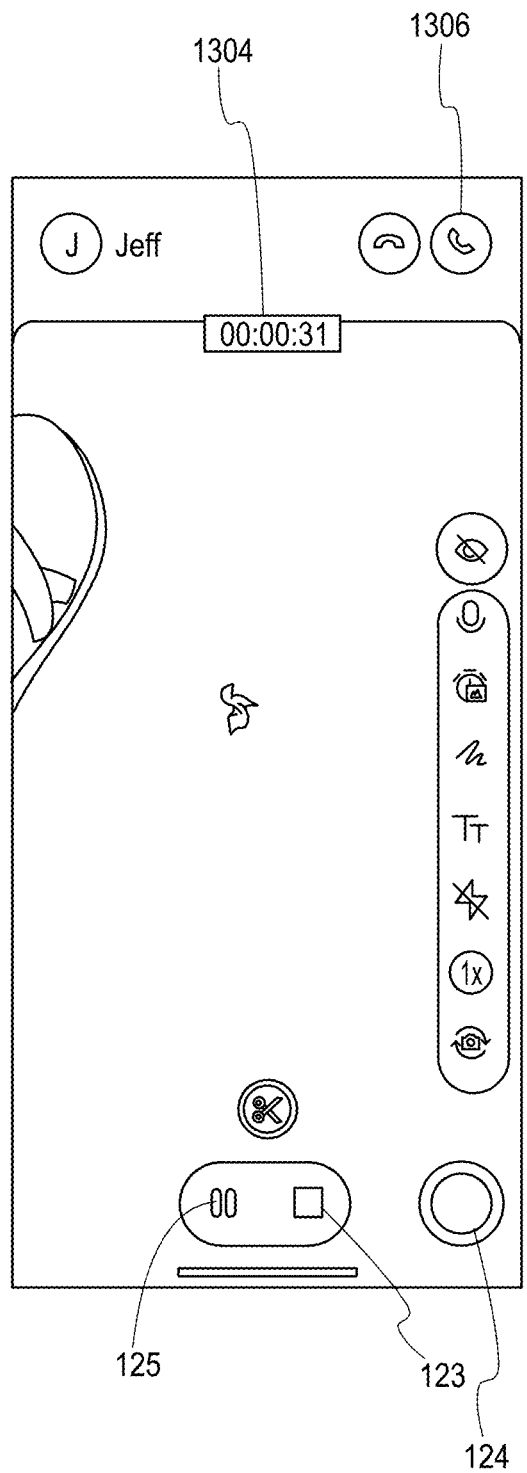
FIG. 13 is a first of a sequence of camera operator interface of the system of FIG. 1 illustrating muted video recording on a device that is connected to a telephone call according to an embodiment.
Figure 14:
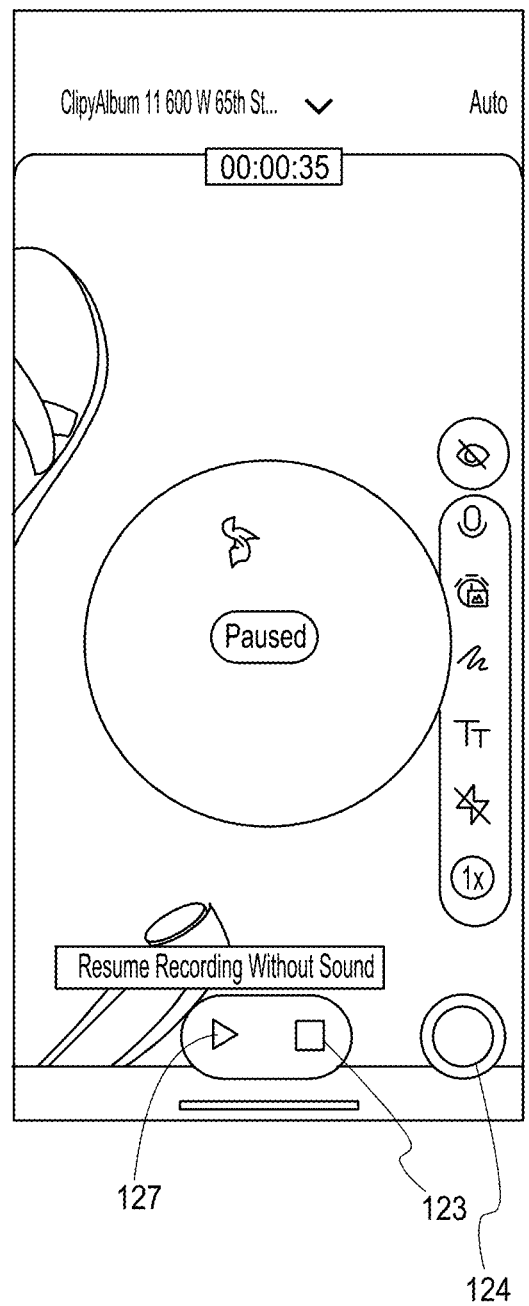
FIG. 14 is a next view of the sequence of camera operator interface views beginning with FIG. 13.

According to an aspect of the disclosure, the mobile app of the recording system 100 includes a feature giving a user the option to record "muted" video (without recording audio) when the user's device is connected to another device on a telephone call. Turning to an example illustrated in FIGS. 13-14, a user receives an incoming call 1302 (FIG. 13) while thirty-one seconds into a recording in progress as indicated by a record timer 1304. When the user accepts/answers the call by activating an answer call control 1306, the mobile app displays a "Paused" message, the stop control 123, and the resume control 127 in the viewfinder window, as shown in FIG. 14. When a user activates the resume control 127, the mobile app will direct the camera device 102 to resume recording muted video to be appended to the last frame of the video recording in progress.

In another embodiment not shown, when the user answers the call by activating the answer call control 1306, the mobile app seamlessly resumes recording muted video by default, and a message may be displayed in the camera interface (not shown) to inform the user that the video recording is being resumed without audio. In a more particular embodiment, the mobile app may automatically pause the video recording after a predetermined amount of time, such as a whole number of seconds, for example from three to ten seconds, unless the user activates a "resume" selection control (not shown) before that time is elapsed, in which case recording of muted video will resume until paused or stopped manually by the user. The displayed message can be, for example, in that case "Recording video without sound. Pausing in <<N>> seconds. Resume?" (not shown), where <<N>> represents a countdown timer displaying a remaining number of seconds to pause. In still other embodiments, in response to the processor detecting that the call has ended, the mobile app resumes recording audio synchronously with the uninterrupted video recording. Alternatively, when the call ends, the mobile app prompts the user to select whether to resume recording audio synchronized with the video in progress, continue recording muted video without audio, or stop recording, receives a user input selection, and causes the recording to proceed according to the selection.

In addition, it will be noted that the above-described on-call muted video recording feature can be used in substantially the same manner in a screen-recorder embodiment, that is, when the video stream being recorded comprises a stream of display screen images rather than images of a physical scene captured by a camera. A user can thus be prompted in like manner to select whether to resume recording, such as after an immediate auto-pause, or whether to continue recording uninterrupted, for example preempting a time-delayed default auto-pause, as described above. In one practical use case, the on-call muted video recording feature could be used when a telephone call is received and answered on a device that is connected to and recording a video conference call using a screen recorder utility. In this manner, although the video conference participant would lose a segment of video conference audio during the telephone call interruption, the video content of the call would continue to be recorded, which may for example include screen-sharing views or other visual content presented by one or more users during the interruption.

General Notes on the Disclosure

Although the process-flow diagrams of this disclosure show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Throughout this disclosure, streams and clips are generally described as audiovisual streams and clips. However, it should be understood that the principles described herein can be applied to streams and clips of purely audio or purely video.

In the preceding description of various examples of embodiments of the disclosed systems and methods, reference is made to the accompanying drawings, which form a part hereof, and in which are shown by way of illustration various example devices, systems, and environments in which aspects of the disclosed system and method can be practiced. Other specific arrangements of parts, example devices, systems, and environments, can be used, and structural modifications and functional modifications can be made without departing from the scope of the disclosed system and method.

The preceding description of the disclosure has been presented for purposes of illustration and description and is not intended to be exhaustive or to limit the disclosure to the precise form disclosed. The description was selected to best explain the principles of the present teachings and the practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification but be defined by the claim(s) set forth below. In addition, although narrow claims may be presented below, it should be recognized that the scope of this disclosure is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional disclosures are not dedicated to the public and the right to file one or more applications to claim such additional disclosures is reserved.

What is claimed is:

1. A digital media recording system comprising:
   a recording component, the recording component being operative to produce a physical main stream of digital media data, the physical main data stream comprising at least one sequence of digital media data units, the digital media data units of the sequence representing digital media units of one type selected from digital audio samples and digital video image frames;
   a storage, the storage comprising a non-volatile computer-readable medium comprising a plurality of physical memory locations;
   an output device;
   a processor, the processor being operatively connected to the recording component to read the digital media data units from the physical main stream of digital media data, the processor being operatively connected to the storage to write the digital media data units to the physical memory locations and to read the digital media data units from the physical memory locations, and the processor being operatively connected to the output device to present the corresponding digital media units in a human observable form;
   a user input interface, the user input interface being operative to receive physical user input and to generate user input data from the physical user input, the user input data representing the processor being operative to read the user input data from the user input interface;
   a software application, the software application comprising computer readable instructions stored in the storage, the processor being operative to read and execute the instructions from the storage;
   the software application including instructions for the processor to receive user inputs from input controls, the input controls being activated by a physical user interaction with the user input interface, the input controls including a record control, a stop control, a pause control, a resume control, a back-clip control, a back-clip pointer selection control;
   the software application further including instructions for the processor,
   when the record control is activated, to:
   begin to record a main media segment comprising a consecutive sequence of digital media data units produced by the recording component after the record control is activated, by so reading from the recording component and writing to the storage the consecutive sequence of digital media data units;
   generate and begin to maintain a logical main stream of media, the logical main stream of media comprising a media timeline defined by a main start pointer and a main end pointer, the main start pointer being a logical entity referencing a physical memory location of a first digital media data unit of the main media segment, and the main end pointer being a logical entity that references a physical memory location of a last digital media data unit of the main media segment, the logical main stream media being maintained by the processor continuously updating the main end pointer to reference the physical memory location of a digital media data unit most recently written to the storage, and
   when the pause control is activated, to:
   pause said recording of the main video footage and said updating the main end pointer;
   when the back-clip control is activated, to:

when the back-clip pointer selection control is activated, receive from the user input interface user input data to determine a contiguous back-clip media segment that was written to storage before the activation of the back-clip control, the back-clip media segment being defined by a static logical back-clip of digital media data, the logical back-clip comprising a back-clip start pointer and a back-clip end pointer, the logical back-clip comprising a media timeline defined by the back-clip start pointer and the back-clip end pointer, the back-clip start pointer being a logical entity referencing a physical memory location to which a first digital media data unit of the back-clip media segment was written, the back-clip end pointer being a logical entity referencing a physical memory location to which a last digital media data unit of the back-clip media segment was written;

when the resume control is activated, to:

resume said recording of the main media segment and said updating the main end pointer;

when the stop control is activated, to:

stop said recording of the main media segment;

write to the storage a digital main media file comprising main file media from the main media segment, the main file media comprising a pre-back-clip media segment and a resumption media segment of the main media segment, the pre-back clip media segment being a contiguous subsegment of the main media segment that was written to storage before the back-clip media segment, the resumption media segment being a contiguous subsegment of the main media segment that was written to storage after the resume control was activated.

2. The digital media recording system of claim 1 wherein the output device comprises a device selected from a display and a speaker.

3. The video recording system of claim 2 wherein, when the main video footage includes a pre-pause video segment, the pre-pause segment being a contiguous segment of the main video footage that was written to storage after the back-clip video segment and before pausing said recording of the main video footage, the software further including instructions for the processor, when the resume control is activated, to display on the display a prompt for the user to select whether to insert the resumption video segment before or append the resumption video segment after the pre-pause video segment, to receive user input data indicating a user selection, and to write the digital main video file so that the resumption video segment is sequenced, in accordance with the user selection, before or after the pre-pause video segment when the digital main video file is replayed.

4. The video recording system of claim 2 wherein the user input data determining a back-clip start pointer and a back-clip end pointer consists of user input data indicating a user selection of the first digital video data frame of the back-clip video segment, the software further including instructions for the processor to automatically set the back-clip end pointer equal to the main end pointer of the paused main video footage recording.

5. The video recording system of claim 2 wherein the software further includes instructions for the processor, when the stop control is activated, to write to the storage a digital back-clip video file comprising the back-clip video segment.

6. The video recording system of claim 2 wherein the user input interface comprises a touchscreen comprised in the display, the touchscreen being operative to activate control areas of the touchscreen where the controls are displayed, to detect user touch inputs on the control areas, and to generate user input data from the user touch inputs, the processor being operatively connected to the touchscreen to read the user input data from the touchscreen and to activate the corresponding controls.

7. The digital media recording system of claim 1, further comprising a touchscreen display, the user input interface comprising a graphical user interface, the graphical user interface including virtual touch controls, the software further including instructions for the processor to display the graphical user interface on the touchscreen display.

8. The video recording system of claim 7 wherein the software further includes instructions for the processor, after a user has activated the resume control, selected to insert the resumption video segment before the pre-pause video segment, thereafter again activated the pause control, and in turn thereafter again activated the resume control to begin recording an additional resumption video segment, to display on the display a prompt for the user to select whether to insert the additional resumption video segment before or append the additional resumption video segment after the pre-pause video segment.

9. The video recording system of claim 8, wherein the software further comprises instructions for the processor, when a plurality of back-clip video segments were defined during a corresponding plurality of pauses of the recording of said main video footage, to write to the storage said digital back-clip video file comprising the plurality of back-clip video segments in an ordered sequence.

10. A video recording system comprising:

a camera, the camera being operative to produce a physical main stream of digital video data comprising sequentially ordered frames of digital video data, each digital video data frame representing a digital frame image;

a storage, the storage comprising a non-volatile computer-readable medium comprising a plurality of physical memory locations;

a display;

a processor, the processor being operatively connected to the camera to read the digital video data frames from the physical main stream of digital video data, the processor being operatively connected to the storage to write the digital video data frames to the physical memory locations and to read the digital video data frames from the physical memory locations, and the processor being operatively connected to the display to display the corresponding digital frame images on the display;

a user input interface, the user input interface being operative to receive physical user input and to generate user input data from the physical user input, the user input data representing the processor being operative to read the user input data from the user input interface;

a software application, the software application comprising computer readable instructions stored in the storage, the processor being operative to read and execute the instructions from the storage;

the software application including instructions for the processor to display controls on the display, the controls being adapted and configured to be activated by physical user input to the user input interface, the controls including a record control;

the software application further including instructions for the processor, when the record control is activated, to:
  begin to record main video footage comprising a consecutive sequence of digital video data frames produced by the camera after the record control is activated, by so reading from the camera and writing to the storage the consecutive sequence of digital video data frames;
  generate and begin to maintain a logical main stream of video, the logical main stream of video comprising a video timeline defined by a main start pointer and a main end pointer, the main start pointer being a logical entity referencing a physical memory location of a first digital video data frame of the main video footage, and the main end pointer being a logical entity that references a physical memory location of a last digital video data frame of the main video footage, the logical main stream of video being maintained by the processor continuously updating the main end pointer to reference the physical memory location of a digital video data frame most recently written to the storage, and
  display a stop control and a pause control;
when the pause control is activated, to:
  pause said recording of the main video footage and said updating the main end pointer;
  display a back-clip control;
  display a resume control;
when the back-clip control is activated, to:
  display a back-clip pointer selection control;
  when the back-clip pointer selection control is activated, to receive from the user input interface user input data to determine a contiguous back-clip video segment that was written to storage before the activation of the back-clip control, the back-clip video segment being defined by a static logical back-clip of digital video data, the logical back-clip comprising a back-clip start pointer and a back-clip end pointer, the logical back-clip comprising a video timeline defined by the back-clip start pointer and the back-clip end pointer, the back-clip start pointer being a logical entity referencing a physical memory location to which a first digital video data frame of the back-clip video segment was written, the back-clip end pointer being a logical entity referencing a physical memory location to which a last digital video data frame of the back-clip video segment was written;
when the resume control is activated, to:
  resume said recording of main video footage and said updating the main end pointer;
when the stop control is activated, to:
  stop said recording of main video footage;
  write to the storage a digital main video file comprising main video file footage from the main video footage, the main video file footage comprising a pre-back-clip video segment and a resumption video segment of the main video footage, the pre-back clip video segment being a contiguous segment of the main video footage that was written to storage before the back-clip video segment, the resumption video segment being a contiguous segment of the main video footage that was written to storage after the resume control was activated.

* * * * *